Patented Dec. 27, 1938

2,141,667

UNITED STATES PATENT OFFICE 2,141,667

WATER-INSOLUBLE AZO DYESTUFFS

Pierre Petitcolas, Rouen, France, assignor to Compagnie Nationale de Matières Colorantes et Manufactures de Produits Chimiques du Nord Réunies, Etablissements Kuhlmann, Paris, France, a corporation of France No Drawing. Application May 21, 1937, Serial No. 144,111. In France May 29, 1936

4 Claims. (Cl. 260—193)

This invention relates to intermediate products, dyestuffs derived therefrom and their process of manufacture.

It has been found according to the present invention that it is possible to condense, at relatively low temperature, without it even being necessary to employ a catalyst, one molecule of a nitro and polyhalogenated derivative of benzene with two molecules of an alkali phenate, this condensation being carried out as far as possible in the absence of water and the nitro and polyhalogenated derivative possessing:

1. Either one atom of halogen in the ortho-position and one in the para-position of the nitro group,
2. Or two atoms of halogen in ortho-positions to the nitro group,
3. Or two atoms of halogen in ortho-positions and one in para-position to the nitro-group.

These derivatives can be represented by the general formula:

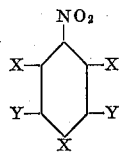

in which at least two of the X's represent halogen atoms and the Y's and, if desired, one X represent hydrogen atoms or substituents such as a halogen, an alkyl group, an alkoxy group and the like.

These products can according to the invention be condensed with two or three molecules of an alkali phenate, this expression covering in a general manner the salts of the alkali metals and the derivatives containing a phenolic OH group such as the phenols and their substitution products and the like. There are thus obtained derivatives of the general formulae:

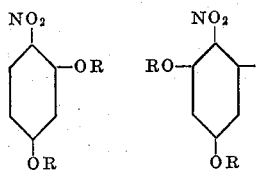

in which R represents an aromatic nucleus which may be substituted and in which the benzene nucleus substituted by the NO₂ group can contain substituents such as an atom of halogen, an alkyl group, an alkoxy group and the like.

By reduction of these derivatives by means of known general methods there are obtained new amino derivatives which can be utilized for the manufacture of dyestuffs. In particular by diazotization of the amines thus obtained and coupling in substance or on the fibre with coupling components of a substantive character such as the arylides of ortho-hydroxy carboxylic acids, of acyl acetic acids and the like, there are obtained according to the invention new insoluble dyestuffs exhibiting a remarkable combination of fastness properties.

The production of these dyestuffs on the fibre can be carried out for the purpose of dyeing cotton, viscose or other natural or artificial fibres, by means of known processes with or without intermediate formation of nitrosamine, diazo amino derivatives, diazo sulphonates, Schiff bases and so on. The dyestuffs produced in substance can be utilized for the dyeing of lacquers, varnishes, organic solvents, plastic materials, rubber and the like.

It has already been proposed to condense 2,4-dichloro-nitrobenzene with phenols in the presence of alkali. If the process is conducted in this manner without first forming the alkali phenate and without eliminating, according to the present invention, the water produced in the formation of this phenate, the condensation is much less easy and does not yield pure products.

By condensing for example 1-nitro-2,4-dichlorobenzene with phenol in the presence of caustic soda and reducing the product obtained there has already been produced a product which has been supposed to be the 1-amino-2,4-diphenoxy-benzene but which is produced in the form of a thick golden yellow oil, while 1-amino-2,4-diphenoxy-benzene is a well defined crystalline product the melting point of which is 86° C., which has been found by applying the process of the present invention. This 1-amino-2,4-diphenoxy-benzene of M. P. 86° C. is thus a new industrial product.

The following examples illustrate the invention without limiting the same thereto:

*Example 1*

58 grams of pure caustic potash are dissolved in 250 grams of phenol. The whole is heated with stirring to the point of distillation of the phenol in order to eliminate completely the water formed. After cooling to 120–130° C. there are added gradually 100 grams of 1-nitro-2,4-dichlorobenzene. The temperature which has risen gradually is maintained at 150–155° C. for 3 hours. The mass (in which the potassium chloride has crystallized in large quantity) is poured into water rendered alkaline by caustic soda. The condensation product, at first pasty, crystallizes rapidly. It is easily purified in methyl alcohol from which it re-crystallizes in the form of small yellowish needles of M. P. 60° C. The 1-nitro-2,4-diphenoxy-benzene reduced with iron filings and acetic acid gives the corresponding base which can be extracted with a solvent, for example ethyl alcohol, from which it crystallizes in the form of brilliant plates of M. P. 86° C.

In the same manner, by replacing the phenol by ortho-cresol, it is possible to prepare the 1-nitro-2,4-di- (o-tolyloxy)-benzene (M. P. 70° C. B. P. 250° C. under 7 mm. pressure). The corresponding base is an oil the hydrochloride of which, which is relatively insoluble, precipitates easily from alcoholic solutions in a state of very great purity by simple addition of concentrated hydrochloric acid.

Example 2

60 grams of pure caustic potash are dissolved in 220 grams of o-chlorophenol. The temperature is gradually raised to 230–235° C. in order completely to eliminate the water formed in the reaction. After cooling to 130° C. 100 grams of nitrodichlorobenzene-1.2.4, are added gradually. The condensation produces a considerable rise of temperature. The whole is heated for several hours to 180–190° C. and then the excess ortho-chlorophenol is driven off with steam. The residue recrystallized from acetic acid is produced in the form of large almost colourless prisms M. P. 65° C. The 1-nitro-2,4-di(o-chlorophenoxy)-benzene reduced as in Example 1 gives with ease the hydrochloride of 1-amino-2,4-di(o-chlorophenoxy)-benzene, in the form of very fine colourless needles.

Example 3

60 grams of pure caustic potash are dissolved in 300 grams of phenol. The water formed in the reaction is eliminated by heating and after cooling to 130° C. there are added in small portions 115 grams of 1-nitro-2,4,5. trichlorobenzene. The temperature automatically rises to about 165° C. This temperature is maintained for several hours. After cooling the whole is treated with absolute methyl alcohol which dissolves the excess phenol and the condensation product. There remains insoluble the potassium chloride of which there is isolated by filtration the quantity corresponding to 2 atoms of chlorine per molecule of trichloronitro-benzene employed. After distillation of the alcohol and steam distillation of the phenol the residue is recrystallized from ethyl alcohol which permits of the isolation in a yield of about 60% of 1-nitro-2,4-diphenoxy-5-chlorobenzene M. P. 75° C. By reduction there is obtained the 1-amino-2,4-diphenoxy-5-chlorobenzene of M. P. 58° C.

The percentages of chlorine and nitrogen calculated and found respectively, are as follows:

|  | Calculated from $C_{18}H_{14}O_2NCl$ | Found |
|---|---|---|
|  | Percent | Percent |
| Cl | 11.4 | 11.2 |
| N | 4.5 | 4.7 |

Under the same conditions, by replacing the phenol by o-cresol there is obtained the 1-nitro-2,4-di(o-tolyloxy)-5-chlorobenzene (from alcohol M. P. 74° C.), which by reduction gives the corresponding base of M. P. 104° C.

With o-chlorophenol the condensation, carried out as above, gives 1-nitro-2,4-di(o-chlorophenoxy)-5-chlorobenzene of M. P. 92° C.; by reduction there is easily isolated the corresponding base of M. P. 79° C.

The p-chlorophenol gives 1-nitro-2,4-di(p-chlorophenoxy)-5-chlorobenzene (from acetic acid M. P. 137° C.) which, by reduction with iron filings and acetic acid, permits of the production, in the form of the relatively insoluble hydrochloride, of the 1-amino-2,4-di(p-chlorophenoxy)-5-chlorobenzene.

Example 4

To 300 grams of phenol are added 60 grams of caustic potash. The water formed in the reaction is distilled off and after cooling to 120° C. there are gradually added 110 grams of 1-nitro-2,4-dichloro-5-methoxy benzene. The temperature is maintained at about 140° C. for some hours and, after driving off the phenol with steam, the condensation product is crystallized from alcohol and separates in the form of fine clear yellow needles of M. P. 89° C. Reduction gives the 1-amino-2,4-diphenoxy-5-methoxybenzene which separates in the form of hydrochloride from a concentrated hydrochloric acid medium.

The phenol can be replaced by the chlorophenols, the cresols, the monoalkyl derivatives of resorcinol or hydroquinone and so on.

Example 5

250 grams of phenol are treated with 60 grams of pure caustic potash. After distilling off the water produced in the reaction and cooling to 140° C. there are added gradually 130 grams of 1-nitro-2,3,5,6-tetrachlorobenzene. The temperature is gradually raised to 170° C. and maintained for 4 hours. The mass is then poured into water rendered alkaline with caustic soda in order to dissolve the excess of phenol. The crystals which have deposited are filtered off, washed with water and then taken up again in boiling acetic acid. On cooling there separate fine plates of 1-nitro-2,6-diphenoxy-3,5-dichlorobenzene of M. P. 160° C. Reduction by one of the customary processes allows of the production of 1-amino-2,6-diphenoxy-3,5-dichlorobenzene (from alcohol M. P. 122° C.).

This base is difficult to diazotize. The diazo compound can be obtained by treatment of the base in a concentrated hydrochloric acid medium with an alkali nitrite; the presence of a little acetic or formic acid assists the diazotization. The diazo compound can be stabilized with zinc chloride; the lemon yellow diazo compound is filtered and then dried by mixing with dehydrated aluminium sulphate.

By replacing the phenol by o-cresol it is possible to obtain the 1-nitro-2,6-di(o-tolyloxy)-3,5-dichlorobenzene of M. P. 139° C. from acetic acid which, on reduction, gives the 1-amino-2,6-di(o-tolyloxy)-3,5-dichlorobenzene of M. P. 160° C.

Example 6

260 grams of phenol and 48 grams of pure caustic potash are treated as in the previous examples. After cooling to 135° C. 65 grams of 1-nitro-2,3,4,6-tetrachlorobenzene are added rapidly. The reaction is fairly violent and the temperature rises to 200° C. while at the same time an abundant precipitate of potassium chloride is observed. The temperature is maintained for some hours longer at 140° C. The mass is allowed to flow into water which has been rendered alkaline. The condensation product 1-nitro-2.4.6-triphenoxy-5-chlorobenzene which has precipitated is recrystallized from boiling acetic acid from which it is deposited in large prisms of slight yellow colour M. P. 109° C.

By reduction in the customary manner there can be isolated a perfectly colourless base (M. P. 102° C.) which is easily diazotized in a hydrochloric-acetic acid medium. The diazo compound gives a stable compound with zinc chloride which is almost insoluble in a saline medium. By simple dilution and filtration it is isolated in a good state of purity; on drying and mixing with dehydrated aluminium sulphate it gives a clear yellow powder sufficiently soluble in water for technical use.

Example 7

2 grams of the β-naphthylamide of 2,3-hydroxynaphthoic acid are pasted with 3 ccs. of denatured alcohol and 0.8 cc. of caustic soda of 34° Bé. The whole is diluted with 2 ccs. of cold water and a clear solution is obtained to which is added to 1 cc. of 33% formaldehyde. After standing for 5 minutes this solution is poured into 1 litre of cold water containing 5.2 ccs. of caustic soda of 34° Bé. and 5 ccs. of sodium sulphoricinoleate 50%. 50 grams of cotton yarn are handled for half an hour at 25-30° C. in this impregnating bath then squeezed and developed immediately in a developing bath containing 3.2 grams of the diazo compound of 1-amino-2,4-diphenoxy-benzene and 40 grams of sodium chloride in 1 litre of water. Development is continued for half an hour in the cold. The skein of cotton is then rinsed, acidified, rinsed, soaped for half an hour at the boiling point in a bath containing 5 grams of Marseilles soap per litre, rinsed again and dried. A bluish red shade is obtained.

The solution of the diazo compound employed above can be obtained in the following manner:

3.2 grams of 1-amino-2,4-diphenoxy benzene are pasted with 10 ccs. of concentrated hydrochloric acid and dissolved by the addition of 50 ccs. of hot water, 50 grams of ice are then added and diazotization carried out with 0.9 gram of nitrite dissolved in 200 ccs. of water, the diazotization occupying half an hour. The diazo solution obtained is filtered, neutralized with sodium acetate and dissolved in a litre of water.

Example 8

35 grams of 1-amino-2,4-diphenoxy-5-chlorobenzene are pasted in 100 ccs. of concentrated hydrochloric acid and subjected to prolonged stirring. Cooling is effected by the addition of 50 grams of ice and diazotization carried out with 9 grams of sodium nitrite dissolved in 20 ccs. of water. The diazonium chloride precipitates in the form of a mobile yellow oil which rapidly crystallizes. After filtration and drying at a moderate temperature it is mixed with dehydrated aluminium sulphate to produce a very homogeneous powder easily soluble in water.

6 grams of the anilide of β-hydroxy-naphthoic acid are pasted with 9 ccs. of denatured alcohol and 3 ccs. of caustic soda of 34° Bé. The whole is diluted with 6 ccs. of cold water and a clear solution obtained to which are added 3 ccs. of 33% formaldehyde. After 5 minutes this solution is poured into 1 litre of cold water containing 6 ccs. of caustic soda of 34° Bé. and 5 ccs. of sodium sulphoricinoleate 50%. 50 grams of cotton yarn are handled for half an hour at 25-30° C. in this impregnating bath, then squeezed and developed immediately in a developing bath containing 15 grams of the diazo compound obtained as described above and 40 grams of sodium chloride in 1 litre of water. The development and subsequent treatment take place as described in the preceding example. A scarlet shade is obtained.

Example 9

4 grams of the p-anisidide of β-hydroxynaphthoic acid are pasted with 4 ccs. of denatured alcohol and 2 ccs. of caustic soda of 34° Bé. The whole is diluted with 8 ccs. of cold water and there is obtained a clear solution to which are added 2 ccs. of 33% formaldehyde. After standing for 5 minutes this solution is poured into 1 litre of cold water containing 10 ccs. of caustic soda of 34° Bé. and 5 ccs. of 50% sodium sulphoricinoleate.

50 grams of cotton yarn are handled for half an hour at 25-30° C. in this impregnating bath, then squeezed and developed immediately in a developing bath containing 1/100 molecule of the diazo derivative obtained as described in Example 5 starting from 1 amino-2.6-diphenoxy-3.5-dichlorobenzene and 40 grams of sodium chloride in 1 litre of water. The development and subsequent treatment take place as in the preceding examples. A yellowish red shade is obtained.

With other coupling components there is obtained a complete range of shades which are indicated in the following table:

| Diazo component | Coupling component | Shade on cotton |
| --- | --- | --- |
| 1-amino-2.4 diphenoxy benzene | Anilide of β-hydroxy-naphthoic acid | Bluish-red. |
| Do | Meta-nitranilide of β-hydroxy-naphthoic acid | Garnet. |
| Do | β-Naphthylamide of β-hydroxy-naphthoic acid | Bluish-red. |
| Do | 5-chlor-2-toluidide of β-hydroxy-naphthoic acid | Do. |
| Do | Para-anisidide of β-hydroxy-naphthoic acid | Red. |
| Do | α-Naphthylamide of β-hydroxy naphthoic acid | Garnet. |
| Do | o-Anisidide of β-hydroxy naphthoic acid | Bluish-red. |
| Do | o-Toluidide of β-hydroxy naphthoic acid | Do. |
| Do | Para-chlor-o-anisidide of β-hydroxy-naphthoic acid. | Do. |
| Do | β-Hydroxy-naphthoyl-2.4-dimethoxy-5-chloro-1-amino-benzene. | Do. |
| Do | Diacetoacetyl-o-tolidide | Yellow. |
| 1-amino-2.6-diphenoxy-3.5-dichloro benzene | Anilide of β-hydroxy-naphthoic acid | Yellowish orange. |
| Do | Meta-nitranilide of β-hydroxy-naphthoic acid | Orange. |
| Do | β-Naphthylamide of β-hydroxy-naphthoic acid | Scarlet. |
| Do | 5-chlor-2-toluidide of β-hydroxy-naphthoic acid | Orange. |
| Do | Para-anisidide of β-hydroxy-naphthoic acid | Yelowish red. |
| Do | o-Toluidide of β-hydroxy-naphthoic acid | Yellowish orange. |
| Do | α-Naphthylamide of β-hydroxy-naphthoic acid | Orange. |
| Do | Ortho-anisidide of β-hydroxy-naphthoic acid | Yellowish orange. |

| Diazo component | Coupling component | Shade on cotton |
|---|---|---|
| 1-amino-2.6-diphenoxy-3.5-dichloro benzene | Para-chlor-o-anisidide of β-hydroxy-naphthoic acid | Orange. |
| Do | β-Oxynaphthoyl-2.4-dimethoxy-5-chloro-benzene | Brownish. |
| Do | Diacetoacetyl-o-tolidide | Yellow. |
| 1-amino-2.4-diphenoxy-5-chlorobenzene | Anilide of β-hydroxy-naphthoic acid | Scarlet. |
| Do | Meta-nitranilide of β-hydroxy-naphthoic acid | Bluish red. |
| Do | β-Naphthylamide of β-hydroxy-naphthoic acid | Red. |
| Do | 5-chlor-2-toluidide of β-hydroxy-naphthoic acid | Garnet red. |
| Do | Para-anisidide of β-hydroxy-naphthoic acid | Bright red. |
| Do | α-Naphthylamide of β-hydroxy-naphthoic acid | Bluish red. |
| Do | o-Anisidide of β-hydroxy-naphthoic acid | Red. |
| Do | o-Toluidide of β-hydroxy-naphthoic acid | Bluish red. |
| Do | p-Chlor-o-anisidide of hydroxy-naphthoic acid | Red. |
| Do | β-Hydroxy-naphthoyl-2.4-dimethoxy-5-chloro-1-amino-benzene. | Bluish red. |
| Do | Diacetoacetyl-o-tolidide | Yellow. |
| 1-amino-2.4.6.-triphenoxy-5-chlorbenzene | Anilide of β-hydroxy-naphthoic acid | Scarlet. |
| Do | Meta-nitranilide of β-hydroxy-naphthoic acid | Red. |
| Do | β-Naphthylamide of β-hydroxy-naphthoic acid | Bright red. |
| Do | 5-chlor-2-toluidide of β-hydroxy-naphthoic acid | Red. |
| Do | Para-anisidide of β-hydroxy-naphthoic acid | Scarlet. |
| Do | Ortho-toluidide of β-hydroxy-naphthoic acid | Do. |
| Do | α-Naphthylamide of β-hydroxy-naphthoic acid | Red. |
| Do | Ortho-anisidide of β-hydroxy-naphthoic acid | Bright scarlet. |
| Do | Para-chlor-o-anisidide of β-hydroxy naphthoic acid. | Scarlet. |
| Do | β-Hydroxy-naphthoyl-2.4-dimethoxy-5-chloro-1-aminobenzene. | Red. |
| Do | Diacetoacetyl-ortho-tolidide | Yellow. |
| 1-amino-2.4.di-p-chlorphenoxy-5-chlor-benzene | Anilide of β-hydroxy-naphthoic acid | Bright red. |
| Do | Meta-nitranilide of β-hydroxy-naphthoic acid | Bluish red. |
| Do | β-Naphthylamide of β-hydroxy-naphthoic acid | Do. |
| Do | 5-chlor-2-toluidide of β-hydroxy-naphthoic acid | Do. |
| Do | β-Hydroxy-naphthoyl-2.4-dimethoxy-5-chloro-1-aminobenzene. | Do. |
| Do | Para-anisidide of β-hydroxy-naphthoic acid | Red. |
| Do | Ortho-toluidide of β-hydroxy-naphthoic acid | Do. |
| Do | α-Naphthylamide of β-hydroxy-naphthoic acid | Bluish red. |
| Do | Ortho-anisidide of β-hydroxy-naphthoic acid | Red. |
| Do | Para-chlor-ortho-anisidide of β-hydroxy-naphthoic acid. | Do. |
| Do | Diacetoacetyl-o-tolidide | Yellow. |
| 1-amino-2-4-di-o-chlorphenoxy-5-chloro-benzene | Anilide of β-hydroxy-naphthoic acid | Bright red. |
| Do | Meta-nitranilide of β-hydroxy-naphthoic acid | Bluish red. |
| Do | β-Naphthylamide of β-hydroxy-naphthoic acid | Do. |
| Do | 5-chlor-2-toluidide of β-hydroxy-naphthoic acid | Do. |
| Do | β-Hydroxynaphthoyl-2.4-dimethoxy-5-chloro-1-aminobenzene. | Do. |
| Do | Para-anisidide of β-hydroxy-naphthoic acid | Red. |
| Do | Ortho-toluidide of β-hydroxy-naphthoic acid | Do. |
| Do | α-Naphthylamide of β-hydroxy-naphthoic acid | Bluish red. |
| Do | Ortho-anisidide of β-hydroxy-naphthoic acid | Red. |
| Do | Para-chlor-ortho-anisidide of β-hydroxy-naphthoic acid. | Do. |
| Do | Diaceto-acetyl-o-tolidide | Yellow. |
| 1-amino-2.4-di-o-tolyloxy-5-chloro-benzene | Anilide of β-hydroxy-naphthoic acid | Red. |
| Do | Meta-nitranilide of β-hydroxy-naphthoic acid | Bluish red. |
| Do | β-Naphthylamide of β-hydroxy-naphthoic acid | Red. |
| Do | 5-chlor-2-toluidide of β-hydroxy-naphthoic acid | Do. |
| Do | β-Hydroxy-naphthoyl-2.4-dimethoxy-5-chloro-1-amino-benzene. | Do. |
| Do | Para-anisidide of β-hydroxy-naphthoic acid | Do. |
| Do | Ortho-toluidide of β-hydroxy-naphthoic acid | Do. |
| Do | α-Naphthylamide of β-hydroxy-naphthoic acid | Bluish red. |
| Do | Ortho-anisidide of β-hydroxy-naphthoic acid | Red. |
| Do | Para-chlor-o-anisidide of β-hydroxy-naphthoic acid. | Do. |
| 1-amino-2.4-di-p-tolyloxy-5-chlorobenzene | Anilide of β-hydroxy-naphthoic acid | Bright red. |
| Do | Meta-nitranilide of β-hydroxy-naphthoic acid | Red. |
| Do | β-Naphthylamide of β-hydroxy-naphthoic acid | Bright red. |
| Do | 5-chlor-2-toluidide of β-hydroxy-naphthoic acid | Bluish Bordeaux. |
| Do | β-Hydroxy-naphthoyl-2.4-dimethoxy-5-chloro-1-amino-benzene. | Bordeaux. |
| Do | Para-anisidide of β-hydroxy-naphthoic acid | Bright red. |
| Do | Ortho-toluidide of β-hydroxy-naphthoic acid | Red. |
| Do | α-Naphthylamide of β-hydroxy-naphthoic acid | Bluish red. |
| Do | Ortho-anisidide of β-hydroxy-naphthoic acid | Red. |
| Do | Para-chlor-o-anisidide of β-hydroxy-naphthoic acid. | Do. |
| 1-amino-2.4-di-phenoxy-5-methoxybenzene | Anilide of β-hydroxy-naphthoic acid | Bluish red. |
| Do | Meta-nitranilide of β-hydroxy-naphthoic acid | Violet red. |
| Do | β-Naphthylamide of β-hydroxy-naphthoic acid | Garnet. |
| Do | 5-chlor-2-toluidide of β-hydroxy-naphthoic acid | Bordeaux. |
| Do | Para-anisidide of β-hydroxy-naphthoic acid | Bluish red. |
| Do | Ortho-toluidide of β-hydroxy-naphthoic acid | Bordeaux. |
| Do | α-Naphthylamide of β-hydroxy-naphthoic acid | Garnet. |
| Do | Ortho-anisidide of β-hydroxy-naphthoic acid | Bluish red. |
| Do | Para-chlor-o-anisidide of β-hydroxy-naphthoic acid. | Do. |
| Do | β-Hydroxy-naphthoyl-2.4-dimethoxy-5-chloro-1-amino-benzene. | Do. |
| Do | Diaceto-acetyl-ortho-tolidide | Yellow. |

I claim:

1. Water insoluble azodyestuffs of the probable general formula:

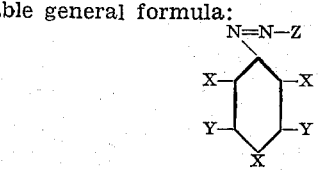

wherein two of the X's represent aryloxy radicals, the other X represents a member of a group consisting of hydrogen, halogens, alkyl, alkoxy and aryloxy radicals, the Y's are members of a group consisting of hydrogen, halogens, alkyl and alkoxy radicals and Z represents a coupling component of substantive character.

2. Water insoluble azodyestuffs of the probable general formula:

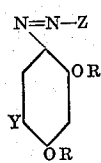

wherein R represents an aromatic nucleus, Y represents a member of the group consisting of hydrogen, halogens, alkyl and alkoxy radicals and Z represents a coupling component of substantive character.

3. Water insoluble azodyestuffs of the probable general formula:

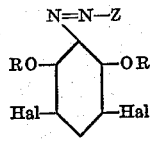

wherein R represents an aromatic nucleus and Z represents a coupling component of substantive character.

4. Water insoluble azodyestuffs of the probable general formula:

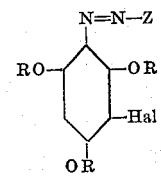

wherein R represents an aromatic nucleus and Z represents a coupling component of substantive character.

PIERRE PETITCOLAS.